(12) United States Patent
Andrews et al.

(10) Patent No.: US 8,409,434 B2
(45) Date of Patent: Apr. 2, 2013

(54) CHLORINATORS

(75) Inventors: Craig Andrews, Kirribilli (AU); Raymond Albert Hin, Kilsyth (AU)

(73) Assignee: Zodiac Pool Care Europe (FR)

( * ) Notice: Subject to any disclaimer, the term of this patent is extended or adjusted under 35 U.S.C. 154(b) by 455 days.

(21) Appl. No.: 12/462,718

(22) Filed: Aug. 7, 2009

(65) Prior Publication Data

US 2010/0032355 A1 Feb. 11, 2010

Related U.S. Application Data

(60) Provisional application No. 61/188,414, filed on Aug. 8, 2008.

(51) Int. Cl.
*C02F 1/76* (2006.01)
*E04H 4/12* (2006.01)

(52) U.S. Cl. ........... 210/167.11; 210/198.1; 210/748.17; 4/507; 204/247

(58) Field of Classification Search .............. 210/167.11, 210/188, 198.1, 232, 748.17, 748.2; 4/507; 204/247
See application file for complete search history.

(56) References Cited

U.S. PATENT DOCUMENTS

| | | | |
|---|---|---|---|
| 3,079,324 A * | 2/1963 | Allen et al. | 204/246 |
| 3,080,977 A | 3/1963 | Evan | |
| 3,218,093 A | 11/1965 | Carlson | |
| 4,290,873 A * | 9/1981 | Weaver | 204/230.2 |
| 4,361,471 A * | 11/1982 | Kosarek | 210/748.2 |
| 4,439,295 A * | 3/1984 | Richards | 210/97 |
| 4,472,256 A * | 9/1984 | Hilbig | 204/266 |
| 4,881,412 A * | 11/1989 | Northedge | 73/861.04 |
| 5,827,434 A * | 10/1998 | Yando | 210/754 |
| 5,976,385 A | 11/1999 | King | |
| 6,096,202 A | 8/2000 | Fulmer | |
| 6,680,026 B1 | 1/2004 | Denkewicz, Jr. et al. | |
| 7,291,261 B1 * | 11/2007 | Rhodes | 210/167.11 |
| 7,329,343 B1 * | 2/2008 | Barnes | 210/167.1 |

FOREIGN PATENT DOCUMENTS

| | | |
|---|---|---|
| GB | 2432405 | 5/2007 |
| WO | WO0068520 | 11/2000 |
| WO | WO 2006110799 | 10/2006 |
| WO | 2010015924 A2 | 2/2010 |
| WO | 2010015924 A3 | 5/2010 |

OTHER PUBLICATIONS

Invitation to Pay Additional Search Fees and Communication Relating to Results of the Partial International Search dated Jan. 12, 2010 in related Application No. PCT/IB2009/006482.
Response dated Jun. 19, 2012 in U.S. Appl. No. 13/334,185.
Office Action dated Mar. 26, 2012 in U.S. Appl. No. 13/334,185.

* cited by examiner

*Primary Examiner* — Fred Prince
(74) *Attorney, Agent, or Firm* — Dean W. Russell; Kilpatrick Townsend & Stockton LLP

(57) ABSTRACT

Treatment devices for fluid such as water are described. Principally (although not necessarily exclusively) designed for use as chlorinators, the devices may divert water flowing in conduits into the devices for treatment and subsequent return to the flow stream. A return tube of the device may be designed to create vortex action, using a pressure differential to evacuate treated water from the device back into the conduit.

13 Claims, 4 Drawing Sheets

CHLORINATORS

REFERENCE TO PROVISIONAL APPLICATION

This application is based on, claims priority to, and hereby refers to U.S. Provisional Patent Application Ser. No. 61/188,414, filed Aug. 8, 2008, having the same title as appears above, the entire contents of which are incorporated herein by this reference.

FIELD OF THE INVENTION

This invention relates to fluid treatment devices and more particularly, although not necessarily exclusively, to chlorinators for circulating water used in swimming pools, spas, hot tubs, or other water-containing vessels.

BACKGROUND OF THE INVENTION

U.S. Pat. No. 6,680,026 to Denkewicz, et al., discloses water-purification equipment useful especially in connection with swimming pools, spas, and hot tubs, where water recirculates. The equipment may provide "plug-in" forms of fluid-flow diverters "designed to penetrate, or fill, openings intermediate remote ends of conduits." See Denkewitz, col. 2, ll. 3-4. As indicated in the Denkewicz patent:

> Embodiments of the invention contemplate diverting flowing fluid to purification equipment formed about or otherwise connected to such diverters, permitting diverted water to be purified before rejoining the flow. The . . . circulating nature of the water permits more of its volume ultimately to be diverted into the equipment for purification.

See id., ll. 13-15.

Positioned within the equipment of the Denkewicz patent is water purification media such as "mineral-based pellets or other objects of silver-, zinc-, or copper-containing material." However, other media alternatively may be used therein. According to the Denkewicz patent, "[c]hlorine or other chemicals which may be dissolved or contacted by the water being diverted are among suitable alternatives." See id., ll. 57-59.

International (Patent) Publication No. WO 2006/110799 of Kennnedy, et al. [sic Kennedy, et al.] details additional equipment used to divert flowing fluid for purification. Diverted fluid may be treated by, for example, a salt water chlorinator (SWC) having an electrolytic cell. Treated water is then returned to the main flow stream via a series of fins, with the overall configuration of the equipment being designed to, among other things, cause the bulk of fluid experiencing pressure spikes to remain in the conduit. See, e.g., Kennedy, p. 12, ll. 4-10. Accordingly, housings detailed in the Kennedy publication may be "fabricated from less pressure-resistant materials, and need not be engineered in the same way as other pressure vessels." See id., ll. 13-14. The contents of the Denkewicz patent and the Kennedy publication are hereby incorporated herein in their entireties by this reference.

SUMMARY OF THE INVENTION

The present invention provides additional equipment in the style of the diverters of the Denkewicz patent and the Kennedy publication. Intended mainly for use as chlorinators, devices of the invention may divert water flowing in conduits into the devices for treatment and subsequent return to the flow stream. Separate, spaced inlet and return tubes may be utilized within the conduits. The return tube of the device additionally may be designed to create vortex action, using a pressure differential to evacuate treated water from the device back into the conduit.

Additional features of the invention may include a housing, upper and lower sections of a clamp, and a threaded locking collar. The sections preferably are snap-fit together about a conduit, with the locking collar thereafter engaging the lower section to enhance a fluid seal. By permitting the sections to connect via snap-fitting, the invention avoids any need to utilize secondary fasteners.

Another optional feature of the invention is inclusion of an adaptor sleeve. The sleeve especially is useful when the main conduit to which the device is to be connected is smaller than a nominal diameter. In these instances, the sleeve may be positioned between the upper and lower housing sections to reduce the spacing between the two. Finally, gas removal from the housing also may occur.

It thus is an optional, non-exclusive object of the present invention to provide innovative fluid treatment devices.

It is, moreover, an optional, non-exclusive object of the present invention to provide "plug-in" types of equipment particular useful for treating circulating water.

It is a further optional, non-exclusive object of the present invention to provide fluid treatment devices in which a return tube creates vortex action to evacuate treated fluid from the devices and into conduits.

It is also optional, non-exclusive object of the present invention to provide fluid treatment devices in which conduit clamps do not require secondary fasteners.

It is another an optional, non-exclusive object of the present invention to provide fluid treatment devices in which a locking collar may be used to enhance the integrity of a fluid seal between the clamp and the conduit.

It is, furthermore, an optional, non-exclusive object of the present invention to provide fluid treatment devices in which an adaptor sleeve may facilitate accommodating smaller conduits when the devices are attached.

Other objects, features, and advantages of the present invention will be apparent to those skilled in the relevant fields with reference to the remaining text and the drawings of this application.

DETAILED DESCRIPTION

Figure 1A:
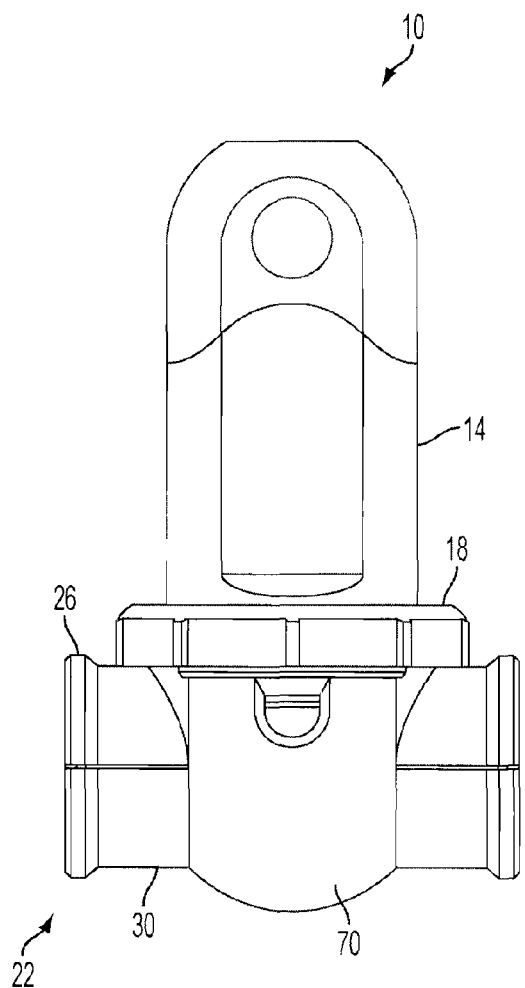
FIGS. 1A-1B are elevational views of exemplary equipment of the present invention.
Figure 1B:
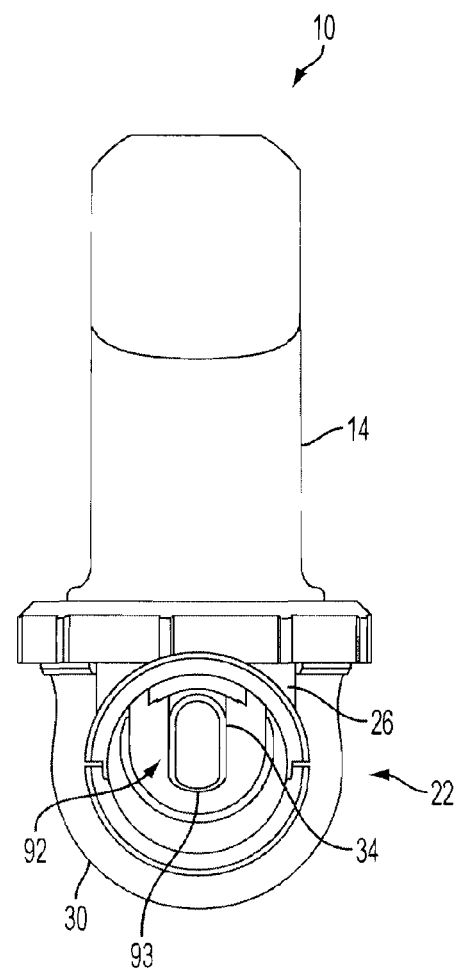
Figure 2:
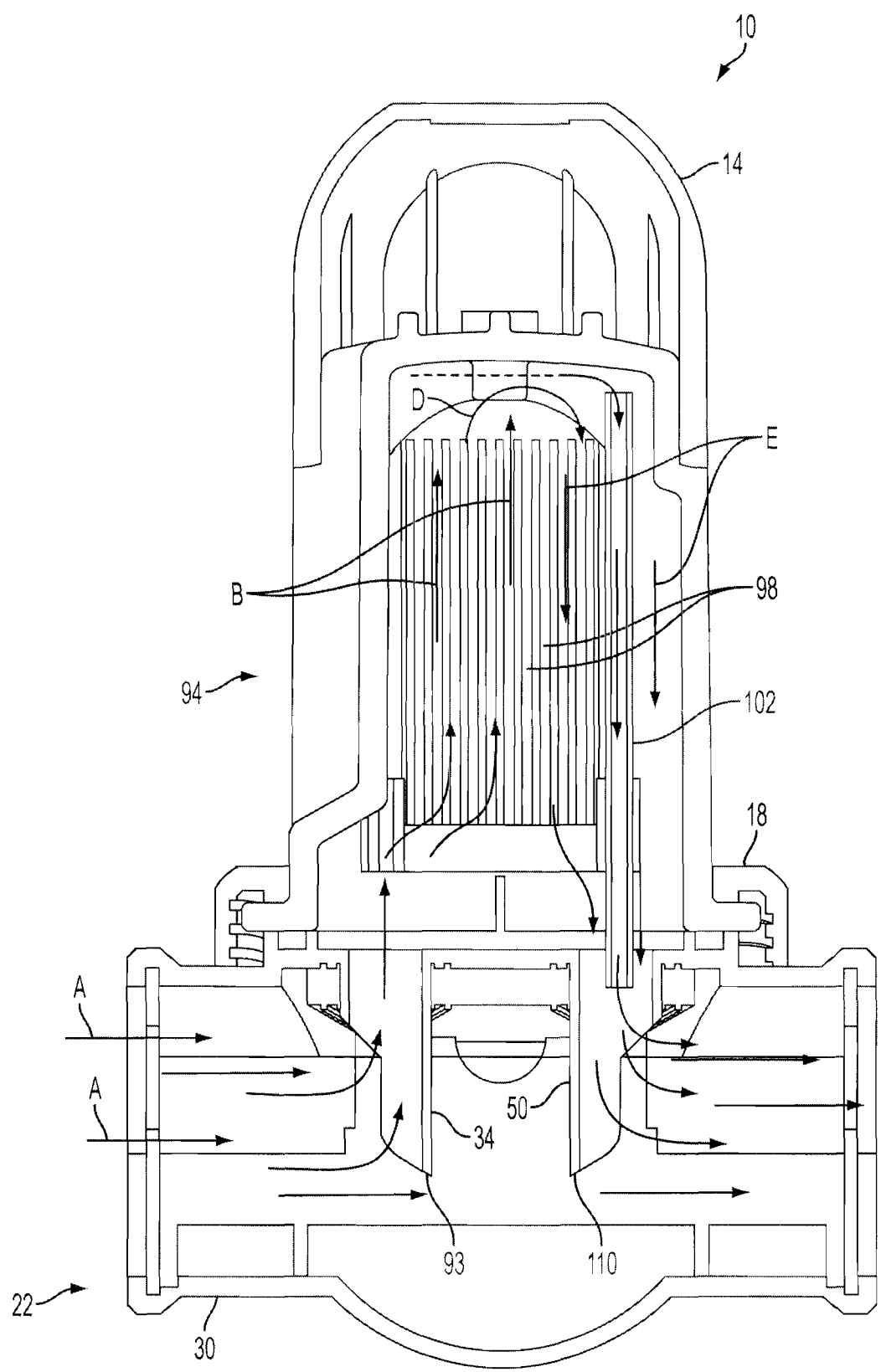
FIG. 2 is a cross-sectional view of the equipment of FIGS. 1A-1B.
Figure 3:
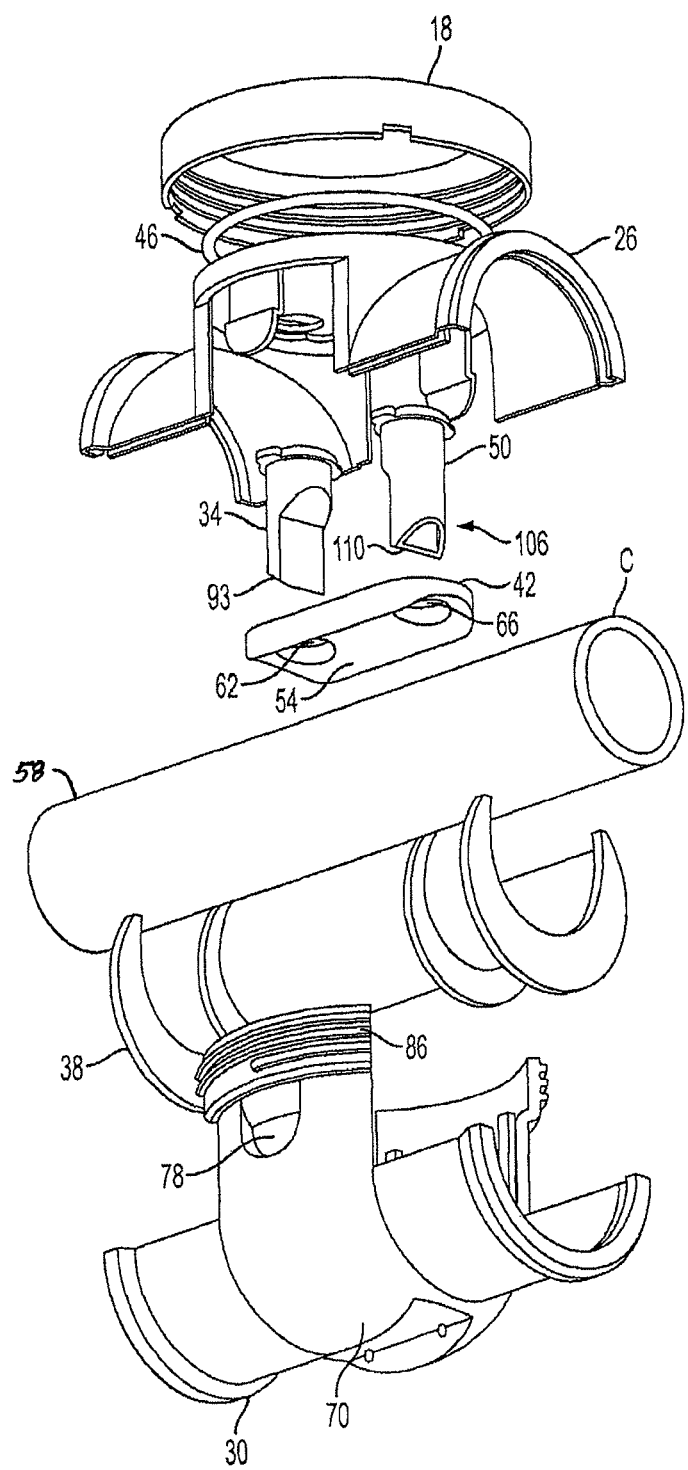
FIG. 3 is an exploded view of portions of the equipment of FIGS. 1A-1B shown in connection with a fluid conduit to which the equipment may attach.
Figure 4:
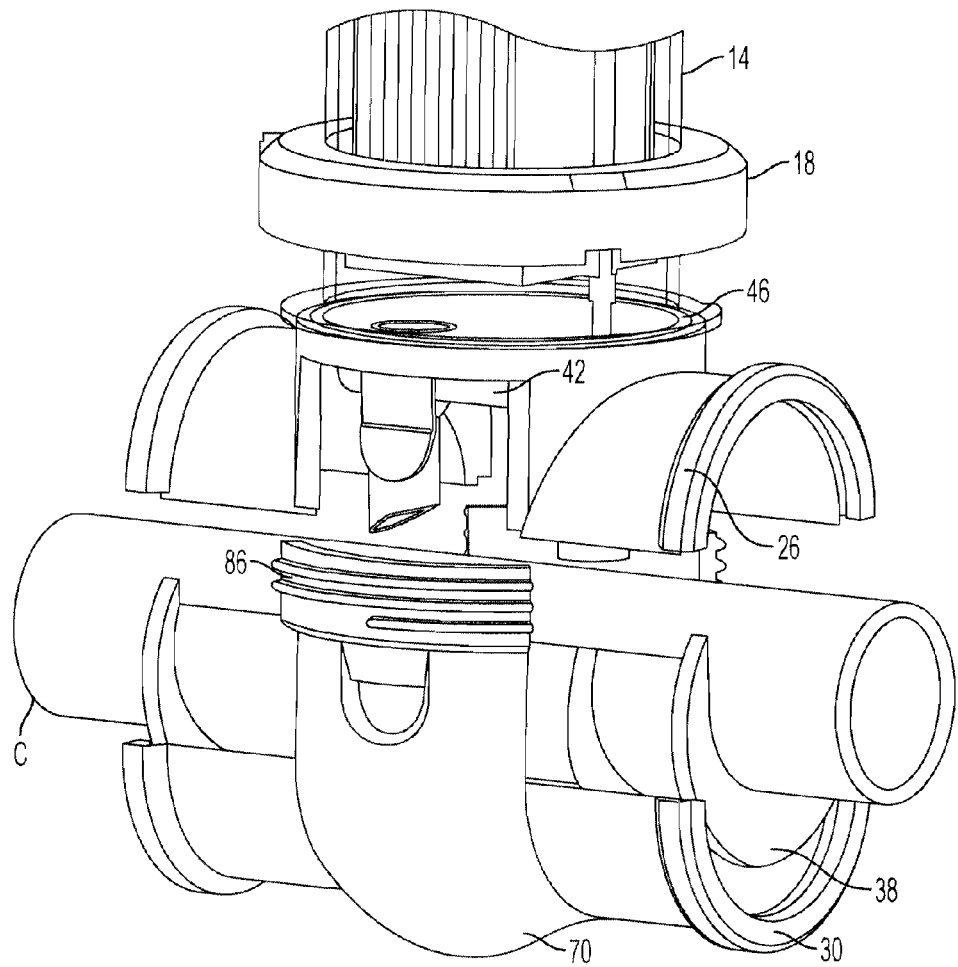
FIG. 4 is another exploded view of portions of the equipment of FIGS. 1A-1B shown in connection with the fluid conduit of FIG. 3.

Depicted in FIGS. 1A-2 is exemplary equipment 10 of the present invention. Equipment 10 preferably constitutes a fluid treatment device. Also illustrated in FIGS. 3-4 is conduit C to which equipment 10 may attach. Conduit C preferably conveys liquid from one location to another. Even more preferably, conduit C conveys water circulating to or from a swimming pool, spa, hot tub, or similar vessel.

Illustrated in FIGS. 1A-1B and various of FIGS. 3-5B are components of equipment 10 including housing 14, locking object in the exemplary form of collar 18, and clamp 22. Clamp 22 may comprise upper section 26 and lower section 30 and is designed to encircle, or otherwise surround, a portion of conduit C. Further, upper section 26 is configured to communicate with (i.e. plug-into) conduit C to permit fluid to flow thereto and therefrom. FIG. 1B depicts inlet 34 through which fluid may flow from conduit C into housing 14 via upper section 26.

Additionally shown in FIGS. 3-4 is optional sleeve adaptor 38 as well as seal 42, o-ring 46, and outlet 50. Sleeve adaptor 38, if present, may be generally semi-cylindrically shaped and configured to nest in a similarly-shaped portion of lower section 30. Adaptor 38 is, in essence, a spacer, intended to fill any gap between conduit C and lower section 30 when the two are attached. Use of adaptor 38 renders equipment 10 more versatile, as it may accommodate conduit C of different diameters.

Seal 42 and o-ring 46 prevent, or at least reduce, fluid leakage between and from conduit C and equipment 10. Seal 42 preferably is an elongated object with concave lower surface 54 contacting outer surface 58 of conduit C. Seal 42 additionally may include two spaced openings 62 and 66, the former receiving inlet 34 and the latter receiving outlet 50. O-ring 46, by contrast, beneficially fits between locking collar 18 and upper section 26.

Figure 5A:
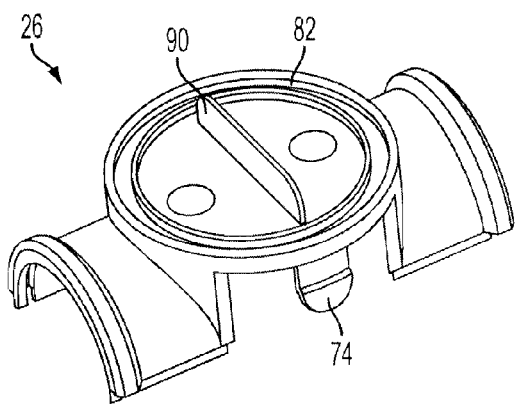
FIG. 5A is an isometric, bird's-eye view of an upper housing section of the equipment of FIGS. 1A-1B.
Figure 5B:
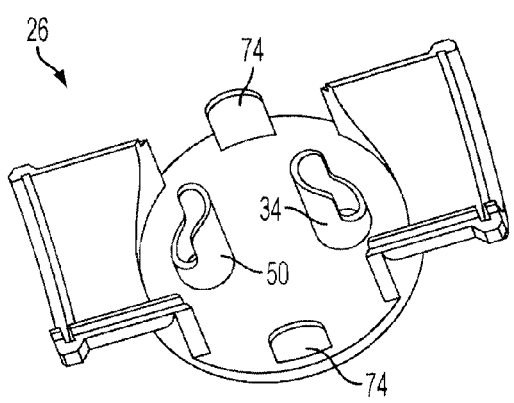
FIG. 5B is an isometric, worm's-eye view of an upper housing section of the equipment of FIGS. 1A-1B.

As depicted especially in FIG. 5B, spaced inlet 34 and outlet 50 preferably are generally tubular in shape and integral with upper section 26. They need not necessarily be so shaped or integrally formed with upper section 26, however. Instead, for example, inlet 34 and outlet 50 could engage or otherwise connect to corresponding portions of section 26.

To employ equipment 10, conduit C must include an opening in its upper wall. Such opening may be drilled or created in any other appropriate way. Advantageously, conduit C will include two openings, with the openings spaced and sized similar to spacing and sizing of inlet 34 and outlet 50 as well as spacing and sizing of openings 62 and 66 of seal 42. Although not presently preferred, conduit C could, for example, include only one opening shaped and sized similar to seal 42.

Lower section 30 may then be placed underneath conduit C with its saddle portion 70 opposite the upper wall openings of conduit C. (As noted earlier, adaptor 38 optionally may be employed as a spacer between conduit C and lower section 30.) Seal 42, by contrast, may be positioned in contact with the upper wall of conduit C so that fluid may communicate between the conduit C and openings 62 and 66. Upper section 26 may be positioned atop seal 42 so that inlet 34 extends into conduit C through opening 62 and outlet 50 extends into conduit C through opening 66. Upper section 26 beneficially includes one or more tabs 74 designed to engage apertures 78 of lower section 30 so as to connect (e.g. snap-fit) upper section 26 to lower section 30 about conduit C. Doing so forms clamp 22 and helps compress seal 42 against conduit C.

As shown in FIG. 5A, upper section 26 may include channel 82 in which o-ring 46 may be placed. Thereafter, internally-threaded collar 18 may engage threads 86 of saddle portion 70 of lower section 30 so as to draw it toward upper section 26 as collar 18 rotates, further facilitating sealing of equipment 10 about conduit C. Collar 18 also connects housing 14 to upper section 26 as detailed in FIGS. 2 and 4. Persons skilled in the art will recognize that collar 18 may engage lower section 30 other than via threads, and that collar 18 need not necessarily be an object distinct from, for example, housing 14.

Upper section 26 further may include baffle 90 positioned between inlet 34 and outlet 50. Baffle 90 assists in preventing fluid entering housing 14 via inlet 34 from immediately exiting the housing 14 via outlet 50. Although baffle 90 need not necessarily be present as part of upper section 26, its presence currently is preferred.

Once connected about conduit C, equipment 10 may function to sanitize, purify, or otherwise treat fluid (such as water) travelling through the conduit C. In use, pressurized fluid flows though conduit C in the direction of arrows A. As it does so, the fluid encounters inlet 34, with the pressure driving some of the fluid into the inlet 34 (while the remaining fluid continues to travel within conduit C). As depicted especially in FIGS. 1B, 2-3, and 5B, inlet 34 may include tapered end 92 whose trailing edge 93 extends farthest into conduit C. End 92 thus presents an open face to the flowing fluid, facilitating its entry into inlet 34. From inlet 34, fluid may then enter housing 14 in which treatment may occur.

Indeed, housing 14 may perform any desired type of fluid treatment. Preferably, however, housing 14 includes therein chlorinator 94, which more preferably is an SWC. Through operation of chlorinator 94, chlorine is added to water entering housing 14 via inlet 34 (i.e. hypochlorous acid is formed) before the water exits the housing 14 via outlet 50 to return to conduit C.

Illustrated in FIG. 2 using arrows B, D, and E is the major flow path of fluid within housing 14. As depicted, fluid flows initially upward, in the direction of arrows B (which is generally perpendicular to arrows A), through plates 98 of chlorinator 94. Under force of gravity, the fluid then travels generally in the direction of arrow D before flowing downward in the direction of arrows E. Note that some fluid flowing in the direction of arrows C is likely to travel again through plates 98, whereas other fluid is not. Regardless, however, all fluid flowing in the direction of arrows E may be received by outlet 50 for return to conduit C.

Produced additionally by salt-water chlorination is hydrogen (and other) gas, which beneficially may be introduced into the circulating water to avoid its undesired build-up within housing 14. Chlorinator 94 thus may include gas tube 102 extending from within housing 14 into outlet 50. Via tube 102 and outlet 50, gas such as hydrogen may be entrained with treated water exiting housing 14 and re-entering conduit C. Tube 102 additionally may function to bleed air from housing 14 and, if desired, may be conjoined with outlet 50 in a single part.

Similar to inlet 34, outlet 50 may include a tapered end 106 extending into conduit C. Unlike end 92 of inlet 34, however, end 106 opens opposite to the direction of fluid flow within the conduit C so as to present a closed face thereto. Stated differently, end 106 opens opposite the direction indicated by arrows A, with its leading edge 110 extending farthest into conduit C. This configuration of end 106 allows the flowing fluid to create a lower-pressure area within outlet 50, creating vortex action facilitating removal of treated water from housing 14. Selecting a lesser diameter for tube 102 than for outlet 50 enhances ability of the lower-pressure region to remove gas from housing 14 too.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An assembly for diverting liquid flowing through a conduit, the assembly comprising:
   a. a housing;
   b. an inlet configured, in use, to permit liquid to flow from the conduit into the housing so as to effect the diversion; and
   c. a conjoined part providing both a first outlet configured, in use, to permit diverted liquid to return to the conduit from the housing and a second outlet configured, in use, to permit substances other than diverted liquid to flow from the housing to the conduit.

2. An assembly for diverting pool or spa water flowing through a. conduit having an opening in a wall thereof, the assembly comprising:
   a. a housing;
   b. an inlet configured, in use, to permit pool or spa water to flow from the conduit into the housing via the opening;
   c. a first outlet configured, in use, to permit pool or spa water to return to the conduit from the housing; and
   d. a second outlet configured, in use, to permit gas to flow from the housing to the conduit.

3. An assembly according to claim 2 in which the gas is air.

4. An assembly according to claim 2 in which the first outlet and the second outlet are conjoined.

5. An assembly according to claim 2 in which the second outlet is configured, in use, to permit gas introduced into the housing from external to the conduit to flow from the housing into the conduit.

6. An assembly for diverting liquid flowing through a conduit having an opening in a wail thereof, the assembly comprising:
   a. a housing;
   b. an inlet configured, in use, to permit liquid to flow from the conduit into the housing via the opening;
   c. a first outlet configured, in use, to permit liquid to return to the conduit from the housing; and
   d. a second outlet configured, in use, to permit gas to flow from the housing to the conduit; and
   in which the first outlet includes a tapered end which, in use, extends into the conduit and opens opposite the direction of the liquid flow in the conduit, creating vortex action facilitating return of liquid to the conduit from the housing.

7. An assembly according to claim 6 in which the inlet includes a tapered end which, in use, presents an open face to the flowing liquid.

8. An assembly according to claim 7 further comprising a chlorinator within the housing.

9. An assembly according to claim 8 in which the chlorinator is a salt-water chlorinator.

10. An assembly according to claim 9 in which the second outlet is included as part of the salt-water chlorinator so as, in use, to permit hydrogen gas to flow from the housing to the conduit.

11. An assembly according to claim 10 in which the second outlet is configured so as, in use, to prohibit entry of liquid.

12. An assembly according to claim 11 in which, in use, the inlet is spaced from the first and second outlets along the length of the conduit.

13. An assembly for circulating pool or spa water flowing through a conduit having an opening in a wall thereof, the assembly comprising:
   a. a housing;
   b. an inlet configured, in use, to permit water to flow from the conduit into the housing via the opening;
   c. a first outlet (i) configured, in use, to permit water to return to the conduit from the housing, (ii) spaced from the inlet along the length of the conduit in use, and (iii) including a tapered end which, in use, extends into the conduit and opens opposite the direction of the water flow in the conduit, creating vortex action facilitating return of water to the conduit from the housing;
   d. a second outlet (i) configured, in use, to permit hydrogen gas to flow from the housing to the conduit and (ii) included as part of a salt-water chlorinator within the housing;
   e. a clamp (i) configured, in use, to surround a portion of the conduit and (ii) comprising an upper section and a lower section, the inlet and the first outlet being integral with the upper section, the upper section including a baffle positioned between the inlet and the first outlet, and the lower section including a threaded saddle portion;
   f. a rotatable locking collar configured, in use, to (i) engage the threaded saddle portion of the lower section of the clamp, (ii) draw the upper and lower sections of the clamp together around the conduit, and (iii) connect the housing to the upper section of the clamp, so as to attach the assembly to the conduit without using bolts; and
   g. an elongated seal having a concave lower surface and configured, in use, to contact the wall of the conduit and define a first opening for receiving the inlet and a second opening for receiving the first outlet.

* * * * *